(12) United States Patent
Feuerstack et al.

(10) Patent No.: US 9,502,989 B2
(45) Date of Patent: Nov. 22, 2016

(54) ENERGY STORAGE DEVICE, SYSTEM WITH ENERGY STORAGE DEVICE AND METHOD FOR GENERATING A SUPPLY VOLTAGE OF AN ENERGY STORAGE DEVICE

(75) Inventors: Peter Feuerstack, Ludwigsburg (DE); Erik Weissenborn, Stuttgart (DE);
(Continued)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 14/124,864

(22) PCT Filed: Apr. 11, 2012

(86) PCT No.: PCT/EP2012/056569
§ 371 (c)(1),
(2), (4) Date: Feb. 4, 2014

(87) PCT Pub. No.: WO2012/167971
PCT Pub. Date: Dec. 13, 2012

(65) Prior Publication Data
US 2014/0167515 A1    Jun. 19, 2014

(30) Foreign Application Priority Data
Jun. 9, 2011    (DE) .......... 10 2011 077 270

(51) Int. Cl.
*H02J 1/00* (2006.01)
*H02M 7/04* (2006.01)
(Continued)

(52) U.S. Cl.
CPC ............ *H02M 7/04* (2013.01); *B60L 11/1853* (2013.01); *B60L 11/1864* (2013.01);
(Continued)

(58) Field of Classification Search
CPC ................. H01M 10/44; Y02T 10/645; H02M 7/49; H02M 7/04; H02J 7/0065; Y02E
(Continued)

(56) References Cited

U.S. PATENT DOCUMENTS

| 5,642,275 A * | 6/1997 | Peng .................. H02M 7/49 363/137 |
| 6,058,032 A * | 5/2000 | Yamanaka .......... B60L 11/1803 318/768 |
| 2014/0042973 A1* | 2/2014 | Kawahara ........... H01M 10/441 320/118 |

FOREIGN PATENT DOCUMENTS

| DE | 3340882 | 6/1985 |
| DE | 102009000674 | 8/2010 |
| DE | 102009003180 | 11/2010 |

OTHER PUBLICATIONS

English machine translation of DE 3340822; Jun. 1985.*
(Continued)

*Primary Examiner* — Jared Fureman
*Assistant Examiner* — Duc M Pham
(74) *Attorney, Agent, or Firm* — Michael Best & Friedrich LLP

(57) ABSTRACT

The invention relates to an energy storage device for generating an n-phase supply voltage for an electrical machine, where n≥1, or for an inverter, with n energy supply branches connected in parallel, each of which can be connected to one of n phase lines, each of the energy supply branches comprising a plurality of series-connected energy storage modules, each comprising: an energy storage cell module and a coupling device configured to selectively connect the energy storage cell module into the respective energy supply branch or to bypass said module, the energy storage cell modules of respective first energy storage modules of an energy supply branch each comprising at least one first energy storage cell, (Continued)

the energy storage cell modules of respective second energy storage modules of an energy supply branch each comprising at least one second energy storage cell, and the first energy storage cells having a lower internal resistance than the second energy storage cells below a predetermined temperature threshold.

6 Claims, 2 Drawing Sheets

(75) Inventors: Martin Kessler, Schwaebisch Gmuend (DE)

(51) Int. Cl.
    *H01M 10/44*     (2006.01)
    *H01M 10/48*     (2006.01)
    *H01G 11/10*     (2013.01)
    *H02J 7/00*     (2006.01)
    *B60L 11/18*     (2006.01)
    *B60L 15/00*     (2006.01)
    *H01M 10/615*     (2014.01)
    *H01M 10/6571*     (2014.01)
    *H02M 7/49*     (2007.01)

(52) U.S. Cl.
    CPC .............. *B60L 15/007* (2013.01); *H01G 11/10* (2013.01); *H01M 10/44* (2013.01); *H01M 10/441* (2013.01); *H01M 10/443* (2013.01); *H01M 10/486* (2013.01); *H01M 10/615* (2015.04); *H01M 10/6571* (2015.04); *H02J 7/0065* (2013.01); *H02M 7/49* (2013.01); *Y02E 60/13* (2013.01); *Y02T 10/645* (2013.01); *Y02T 10/7005* (2013.01); *Y02T 10/7011* (2013.01); *Y02T 10/7022* (2013.01); *Y02T 10/7061* (2013.01); *Y10T 307/702* (2015.04)

(58) Field of Classification Search
    CPC ................ 60/13;H01G 11/10; Y10T 307/702; B60L 11/1853
    USPC .......................................................... 307/80
    See application file for complete search history.

(56) References Cited

OTHER PUBLICATIONS

International Search Report for Application No. PCT/EP2012/056569 dated Sep. 3, 2012 (English Translation, 2 pages).

\* cited by examiner

ENERGY STORAGE DEVICE, SYSTEM WITH ENERGY STORAGE DEVICE AND METHOD FOR GENERATING A SUPPLY VOLTAGE OF AN ENERGY STORAGE DEVICE

BACKGROUND OF THE INVENTION

The invention relates to an energy storage device, a system comprising an energy storage device and a method for generating a supply voltage of an energy storage device, in particular in a battery direct converter circuit when starting or starting up an electrically operated vehicle.

The trend is that in the future electronic systems which combine new energy storage technologies with electrical drive technology will be used increasingly both in stationary applications, such as e.g. wind power installations or solar installations, and in vehicles, such as hybrid or electric vehicles.

FIG. 1, for example, shows the feed of alternating current into a three-phase electric machine 101. In this case, a DC voltage provided by a DC voltage intermediate circuit 103 is converted into a three-phase AC voltage by means of a converter in the form of a pulse-controlled inverter 102. The DC voltage intermediate circuit 103 is fed by a line 104 of battery modules 105 connected in series. In order to be able to meet the requirements for power and energy provided for a respective application, often a plurality of battery modules 105 are connected in series in a traction battery 104. An energy storage system of this type is often used for example in electrically operated vehicles.

The series circuit comprising a plurality of battery modules is associated with the problem that the entire line fails if a single battery module fails. Such a failure of the energy supply line can result in failure of the entire system. Furthermore, temporarily or permanently occurring power reductions of an individual battery module can result in power reductions in the entire energy supply line.

The document U.S. Pat. No. 5,642,275 A1 describes a battery system with an integrated inverter function. Systems of this type are known under the name Multilevel Cascaded Inverter or else Battery Direct Inverter (BDI). Such systems comprise DC sources in a plurality of energy storage module lines, which can be connected directly to an electric machine or an electrical power supply system. In this case, single-phase or polyphase supply voltages can be generated. The energy storage module lines in this case have a plurality of energy storage modules which are connected in series, wherein each energy storage module has at least one battery cell and an assigned controllable coupling unit, which makes it possible to interrupt the respective energy storage module line or to bridge the respectively assigned at least one battery cell or to switch the respectively assigned at least one battery cell into the respective energy storage module line, depending on control signals. By suitable driving of the coupling units, for example with the aid of pulse width modulation, suitable phase signals for controlling the phase output voltage can also be provided, with the result that a separate pulse-controlled inverter can be dispensed with. The pulse-controlled inverter required for controlling the phase output voltage is thus integrated into the BDI, as it were.

BDIs usually have a higher efficiency and a higher degree of failsafety in comparison with conventional systems, as shown in FIG. 1. The failsafety is ensured, inter alia, by virtue of the fact that defective, failed or not fully effective battery cells can be disconnected from the energy supply lines by suitable bridging driving of the coupling units.

In both systems, both in the system shown in FIG. 1 and in a BDI, it can happen, precisely in the case of use in electrically operated vehicles, that the battery cells are to be operated at low ambient temperatures, for example in winter. Customary batteries, such as lithium-ion batteries, for example, have a temperature-dependent internal resistance. At low temperatures, the internal resistance is increased, and so under certain circumstances the full power cannot be drawn from the battery. At low ambient temperatures, therefore, depending on the composition of the battery cells used, the battery cells have to be preconditioned, that is to say that the battery cells have to be heated, in order that the power required for driving, in particular for starting up, can be provided. The heating process is energy- and time-intensive in this case.

SUMMARY OF THE INVENTION

In accordance with one embodiment, the present invention provides an energy storage device for generating an n-phase supply voltage for an electric machine, wherein $n \geq 1$, or for an inverter, comprising n energy supply branches which are connected in parallel and which are each connectable to one of n phase lines, wherein each of the energy supply branches has a large number of energy storage modules which are connected in series and which each comprise: an energy storage cell module, and a coupling device, which is designed to switch or to bridge the energy storage cell module selectively into the respective energy supply branch, wherein first energy storage cell modules of first energy storage modules of an energy supply branch have at least one first energy storage cell, wherein second energy storage cell modules of second energy storage modules of an energy supply branch have at least one second energy storage cell, and wherein the first energy storage cells have a lower internal resistance than the second energy storage cells below a predetermined temperature threshold value.

In accordance with a further embodiment, the present invention provides a system comprising an energy storage device according to the invention, an n-phase electric machine, wherein $n \geq 1$, the phase lines of which are connected to the phase connections of the energy storage device, and a control device, which is designed to selectively drive the coupling devices of the energy storage modules for generating a supply voltage for the electric machine.

In accordance with a further embodiment the present invention provides a method for generating a supply voltage with an energy storage device according to the invention, comprising the following steps, detecting the temperature of the energy storage cells of the energy storage device, and driving the coupling devices of the first energy storage modules in a manner dependent on the detected temperature for generating a supply voltage at the phase lines from the output voltages of the energy storage cells of the first group of energy storage modules.

One concept of the present invention is to reduce the energy requirement and time requirement for heating energy storage cells of energy storage devices for preconditioning the energy storage cells by using a energy storage device comprising individually switchable energy storage modules, in which some of the available energy storage cells are embodied specifically for use at low temperatures. For this purpose, it is possible to use special power cells, for example, which have a lower internal resistance $R_i$ (output resistance) compared with conventional energy storage cells at low temperatures. During a process of starting an electrically operated vehicle, for example, the required power can then be drawn only from the specifically configured power cells, which do not have to be separately preheated for starting at low temperatures, for example in winter. As a result, the electrically operated vehicle is ready for starting more rapidly than if the energy storage cells first have to be preconditioned. After the initial starting process, the other energy storage cells heat up automatically as a result of the operation of the electric machine, and so it is possible to have recourse again to all the energy storage cells during the journey.

A further concept of the present invention is for the specifically configured power cells additionally to be provided with heating elements in order to enable these cells to be heated at particularly low temperatures. Since, rather than the entire energy storage device, only dedicated energy storage cells have to be preheated, and the latter also only by a smaller magnitude than conventional energy storage cells, the energy requirement and time requirement for heating the specifically configured power cells can be minimized.

BRIEF DESCRIPTION OF THE DRAWINGS

Further features and advantages of embodiments of the invention will become apparent from the following description with reference to the accompanying drawings.

In the figures.

DETAILED DESCRIPTION

Figure 1:
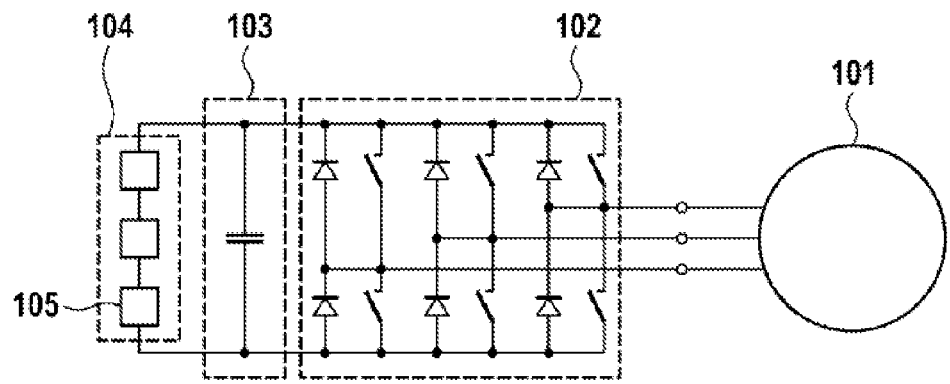
FIG. 1 shows a schematic illustration of a voltage supply system for a three-phase electric machine.
Figure 2:
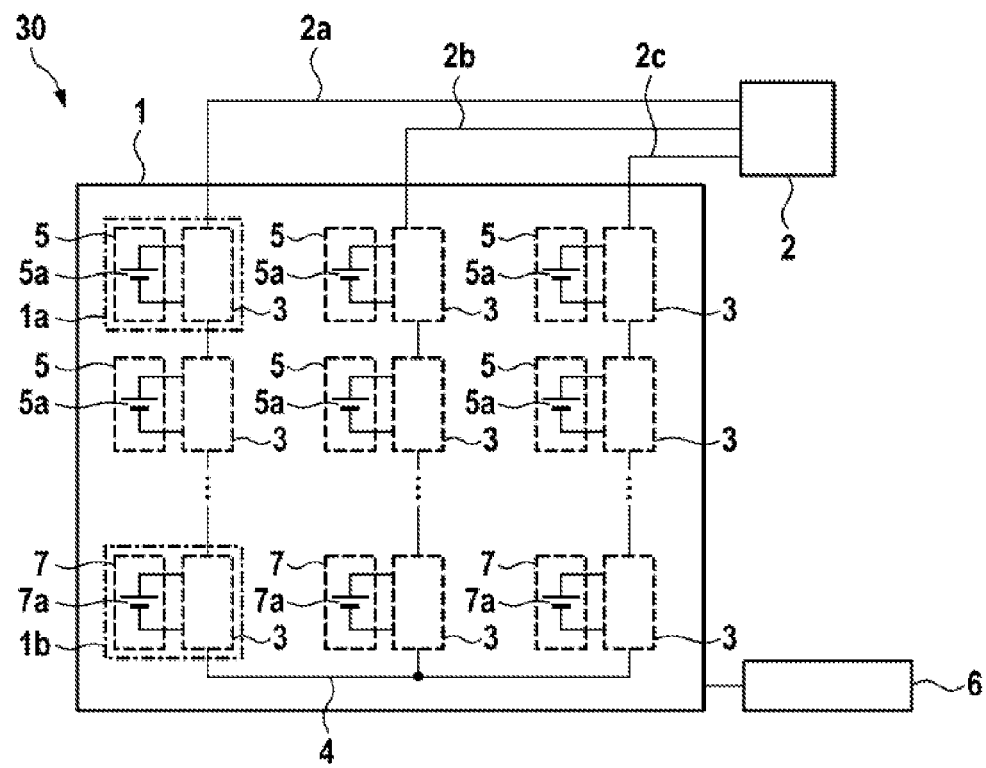
FIG. 2 shows a schematic illustration of a system comprising an energy storage device and a heating device in accordance with one embodiment of the present invention.

FIG. 2 shows a system 30 for the voltage conversion of DC voltage provided by energy storage modules 1a into an n-phase AC voltage. The system 30 comprises an energy storage device 1 comprising energy storage modules 1a, 1b connected in series in energy supply branches. Three energy supply branches are shown by way of example in FIG. 2, which are suitable for generating a three-phase AC voltage, for example for a three-phase machine 2. In principle, however, any other number of phases n is likewise possible. At each energy supply branch, the energy storage device 1 has an output connection, which are respectively connected to phase lines 2a, 2b, 2c. By way of example, the system 30 in FIG. 2 serves for feeding an electric machine 2, in particular in an electrically operated vehicle. However, provision can also be made for the energy storage device 1 to be used for generating electric current for an energy supply system 2. For the case where the energy storage device 1 has only one energy supply branch, provision can be made for the energy storage device 1 to be designed for supplying an inverter or an intermediate circuit.

The system 30 can furthermore comprise a control device 6, which is connected to the energy storage device 1 and with the aid of which the energy storage device 1 can be controlled in order to provide the desired output voltages at the respective phase connections 2a, 2b, 2c.

The energy supply branches can be connected at their end to a reference potential 4 (reference rail), which, in the embodiment illustrated, carries a mid potential with respect to the phase lines 2a, 2b, 2c of the electric machine 2. The reference potential 4 can be a ground potential, for example. In the case where the energy storage device 1 is designed to feed an intermediate circuit of an inverter, provision can be made for just a single energy supply branch to be provided, which is connected by its two output connections to the input connections of the intermediate circuit. Each of the energy supply branches has at least two energy storage modules 1a, 1b connected in series. By way of example, the number of energy storage modules 1a, 1b per energy supply branch is three in FIG. 2, but any other number of energy storage modules 1a, 1b is likewise possible. Preferably, in this case each of the energy supply branches comprises the same number of energy storage modules 1a, 1b, but it is also possible to provide a different number of energy storage modules 1a, 1b for each energy supply branch. For reasons of clarity, only two of the energy storage modules are indicated by reference signs 1a and 1b, but the other energy storage modules can be designated in a corresponding manner.

The energy storage modules 1a, 1b each comprise a coupling device 3 having a plurality of coupling elements (not shown). Furthermore, the energy storage modules 1a, 1b each comprise an energy storage cell module 5 and 7, respectively, having at least one energy storage cell 5a and 7a, respectively. In this case provision can also be made for a plurality of the energy storage cells 5a and 7a to be connected in series in a energy storage cell module 5 and 7, respectively.

The energy storage cell modules 5 are connected to input connections of the associated coupling devices 3 via connecting lines. The coupling devices 3 can be designed, by way of example, as a full-bridge circuit having four coupling elements or as a half-bridge circuit having two coupling elements. In this case, the coupling elements can each comprise semiconductor switches, such as field effect transistors (FETs), for example. The coupling elements can be embodied for example as power semiconductor switches, for example in the form of IGBTs (Insulated Gate Bipolar Transistors), JFETs (Junction Field-Effect Transistors) or as MOSFETs (Metal Oxide Semiconductor Field-Effect Transistors).

The coupling devices 3 can be driven in such a way, for example with the aid of the control device 6, that the energy storage cell modules 5 and 7 are selectively switched between the output connections of the energy storage modules 1a, 1b or that the energy storage cell modules 5 and 7 are bridged. By means of suitable driving of the coupling devices 3, therefore, individual energy storage cell modules 5 and 7 of the energy storage modules 1a, 1b can be integrated into the series circuit of an energy supply branch in a targeted manner.

In this case, a first group of energy storage cell modules 5 can comprise lithium-ion batteries for example as energy storage cells 5a. Said lithium-ion batteries can be conventional lithium-ion batteries, for example, which have a significantly higher internal resistance $R_i$ (output resistance) at a low operating temperature than at a high operating temperature. By way of example, the internal resistance $R_i$ of a conventional lithium-ion battery is approximately ten times higher at a temperature of $-10°$ C. than at a temperature of $25°$ C.

A second group of energy storage cell modules 7 respectively arranged in each of the energy supply branches comprises, by contrast, energy storage cells 7a which are specifically designed power cells having a significantly lower internal resistance $R_i$ than the conventional energy storage cells 5a, for example than conventional lithium-ion batteries, below a predetermined temperature threshold value. In this case, it is possible to have recourse to the second group of energy storage cell modules 7 if the electric machine connected to the energy storage device has a high power requirement at a low output voltage. In this case, provision can be made for having recourse only to the energy storage cells 7a of the second group of energy storage cell modules 7 for the purpose of generating the output voltage of the energy storage device 1.

Figure 3:
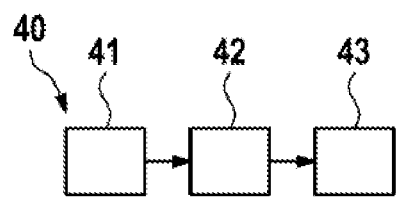
FIG. 3 shows a schematic illustration of a method for heating energy storage cells of an energy storage device in accordance with a further embodiment of the present invention.

FIG. 3 shows a schematic illustration of an exemplary method 40 for generating a supply voltage with an energy storage device 1. In a first step 41, the temperature T of the energy storage cells 5a and 7a is detected. If the temperature T is above a certain predetermined threshold value, it is not necessary to differentiate between the first and second groups of energy storage modules 1a and 1b, since the energy storage cells 5a and 7a of both groups have an equally sufficiently low internal resistance $R_i$. In this case, the energy storage device 1 can be operated as usual.

By way of example, the temperature T in winter can be relatively low, however, for the use of an energy storage device 1 in an electrically operated vehicle. At low temperatures, the energy storage cells 5a have an internal resistance $R_i$ lying above an acceptable threshold, whereas the specifically designed energy storage cells 7a have an internal resistance $R_i$ above a resistance threshold value which can ensure a sufficiently good power output.

In this case, in a second step 42, provision can be made for detecting the power requirement or current requirement of the electric machine 2. Particularly during processes for starting an electrically operated vehicle, for example during the start-up, high currents but only low supply voltages are required. Therefore, the second step 42 can involve determining whether it is sufficient to generate the supply voltage of the energy storage device 1 only with the output voltages of some of the energy storage cells 5a and 7a, that is to say whether the current requirement of the electric machine 2 is above a predetermined current requirement threshold value.

If this is the case, in a third step 43, the control device 6 can drive the coupling devices 3 of the second group of energy storage modules 1b per energy supply branch which are configured with specifically designed power cells as energy storage cells 7a. In this case, the other energy storage modules 1a are not used for generating the output voltage of the energy storage device 1. It is only after the end of the starting or starting-up process that the energy storage cells 5a of the first group of energy storage modules 1a can be included again in the generation of the supply voltage when the energy storage cells 5a have attained a sufficiently high operating temperature as a result of the operation of the energy storage device 1.

Figure 4:
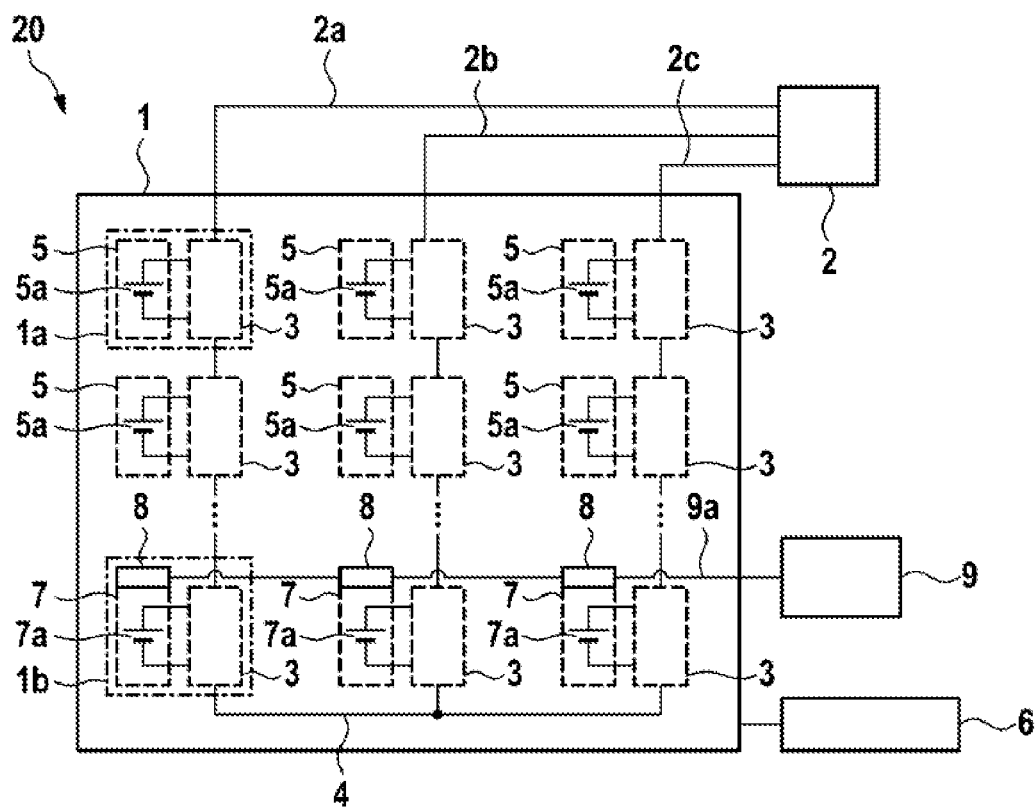
FIG. 4 shows a schematic illustration of a system comprising an energy storage device in accordance with a further embodiment of the present invention.

FIG. 4 shows a further exemplary embodiment of a system 20 comprising an energy storage device 1. The system 20 shown in FIG. 4 differs from the system 30 shown in FIG. 2 only in that a respective heating element 8 is additionally arranged in the energy storage modules 1b having the specifically designed power cells. By way of example, the heating element 8 can be a PTC thermistor, for example composed of a ceramic material such as barium titanate. The heating element 8 can also be produced on the basis of doped silicon. The heating elements 8 of the energy storage modules 1b are arranged in proximity to the energy storage cells 7a and can be driven by a heating device 9. The heating device 9 is designed to detect the temperature T, for example the operating temperature, of the energy storage cells 7a and to drive the heating elements 8 in a manner dependent on the detected temperature T.

At comparatively low temperatures, for example in winter, the ambient temperatures can be so low that a system 20 used for the drive of an electric vehicle or hybrid vehicle has to be preheated. For this purpose, the heating device 9 drives the heating elements 8 in such a way that the energy storage cells 7a are heated until the temperature T has reached an operating temperature threshold at which the energy storage cells 7a have a sufficiently low internal resistance $R_i$. Since the energy storage cells 7a in contrast to the energy storage cells 5a are correspondingly embodied power cells having a comparatively low internal resistance $R_i$, the energy requirement and time requirement for heating the energy storage cells 7a with the aid of the heating elements 8 are correspondingly low.

The invention claimed is:

1. An energy storage device for generating an n-phase supply voltage for an electric machine, wherein n≥1, or for an inverter, the energy storage device comprising:

n energy supply branches which are connected in parallel and which are each connectable to one of n phase lines, wherein each of the energy supply branches has a large number of energy storage modules which are connected in series and which each comprise:
an energy storage cell module, and
a coupling device, which is designed to switch or to bridge the energy storage cell module selectively into the respective energy supply branch,
wherein the energy storage cell modules of a respective first group of energy storage modules of an energy supply branch have at least one first energy storage cell, and
wherein the energy storage cell modules of a respective second group of energy storage modules of an energy supply branch have at least one second energy storage cell,
wherein the first energy storage cells have a lower internal resistance than the second energy storage cells below a predetermined temperature threshold value;
a heating device configured to detect the temperature of the energy storage cells of the energy storage device; and
a control device configured to drive the coupling devices of the first energy storage modules in a manner dependent on the detected temperature for generating a supply voltage at the phase lines from the output voltages of the energy storage cells of the first energy storage modules.

2. The energy storage device as claimed in claim 1, wherein the first energy storage modules of an energy supply branch each have a heating element for the at least one energy storage cell, and wherein the heating device is connected to the heating elements and is designed to drive the heating elements for heating the energy storage cells of the first energy storage modules.

3. The energy storage device as claimed in claim 2, wherein the heating elements comprise PTC thermistors.

4. A system, comprising:
an energy storage device as claimed in claim 1;
an n-phase electric machine, wherein n≥1, the phase lines of which are connected to the phase connections of the energy storage device; and a control device, which is designed to selectively drive the coupling devices of the energy storage modules for generating a supply voltage for the electric machine.

5. A method for generating a supply voltage with an energy storage device, the energy storage device having n energy supply branches which are connected in parallel and which are each connectable to one of n phase lines, wherein each of the energy supply branches has a large number of energy storage modules which are connected in series and which each comprise an energy storage cell module, and a coupling device, which is designed to switch or to bridge the energy storage cell module selectively into the respective energy supply branch, wherein the energy storage cell modules of a respective first group of energy storage modules of an energy supply branch have at least one first energy storage cell, and wherein the energy storage cell modules of a respective second group of energy storage modules of an energy supply branch have at least one second energy storage cell, wherein the first energy storage cells have a lower internal resistance than the second energy storage cells below a predetermined temperature threshold value, the method comprising:

detecting the temperature of the energy storage cells of the energy storage device; and driving the coupling devices of the first energy storage modules in a manner dependent on the detected temperature for generating a supply voltage at the phase lines from the output voltages of the energy storage cells of the first energy storage modules.

6. The method as claimed in claim 5, wherein the driving the coupling devices is carried out if the current requirement of the n-phase electric machine exceeds a predetermined current requirement threshold value.

* * * * *